US008822555B2

(12) United States Patent
Kaiso et al.

(10) Patent No.: US 8,822,555 B2
(45) Date of Patent: Sep. 2, 2014

(54) POLYAMIDE PARTICLES AND PROCESS FOR PRODUCING SAME

(75) Inventors: Koji Kaiso, Ube (JP); Masanori Abe, Ube (JP); Tsunemi Sugimoto, Ube (JP)

(73) Assignee: Ube Industries, Ltd., Ube-shi, Yamaguchi (JP)

( * ) Notice: Subject to any disclaimer, the term of this patent is extended or adjusted under 35 U.S.C. 154(b) by 148 days.

(21) Appl. No.: 13/254,026

(22) PCT Filed: Mar. 2, 2010

(86) PCT No.: PCT/JP2010/053309
§ 371 (c)(1),
(2), (4) Date: Aug. 31, 2011

(87) PCT Pub. No.: WO2010/101134
PCT Pub. Date: Sep. 10, 2010

(65) Prior Publication Data
US 2011/0311821 A1 Dec. 22, 2011

(30) Foreign Application Priority Data
Mar. 5, 2009 (JP) ................................ 2009-052174

(51) Int. Cl.
| C08J 9/36 | (2006.01) |
| C08J 9/00 | (2006.01) |
| C08J 3/14 | (2006.01) |
| C08G 69/26 | (2006.01) |
| C08G 69/02 | (2006.01) |
| C08G 69/14 | (2006.01) |

(52) U.S. Cl.
CPC ............ C08G 69/02 (2013.01); C08J 2377/00 (2013.01); C08J 3/14 (2013.01); C08G 69/26 (2013.01); C08G 69/14 (2013.01)
USPC .............. 521/61; 521/183; 521/189

(58) Field of Classification Search
CPC ........ C08J 3/14; C08J 2377/00; C08G 69/02; C08G 69/14; C08G 69/26
USPC .......................................... 521/61, 183, 189
See application file for complete search history.

(56) References Cited

U.S. PATENT DOCUMENTS

| 2,958,677 | A | * | 11/1960 | Kleinschmidt ............... 528/492 |
| 5,128,125 | A | * | 7/1992 | Barnes ....................... 424/78.08 |
| 5,268,223 | A | | 12/1993 | Qureshi et al. |
| 2007/0269656 | A1 | | 11/2007 | Helft et al. |
| 2008/0161442 | A1 | | 7/2008 | Nakayama et al. |

FOREIGN PATENT DOCUMENTS

| EP | 1 964 875 A1 | 9/2008 |
| GB | 2 257 144 A | 1/1993 |
| JP | 2005-054153 | 3/2005 |
| JP | 2005239575 A * | 9/2005 |
| JP | 2006-169373 | 6/2006 |
| JP | 2006-328173 | 12/2006 |
| JP | 2007-056085 | 3/2007 |
| JP | 2007-106895 | 4/2007 |
| JP | 2007-515500 | 6/2007 |
| JP | 2007-204767 | 8/2007 |
| JP | 2008-038037 | 2/2008 |
| JP | 2008-086874 | 4/2008 |
| JP | 2008-088296 | 4/2008 |
| JP | 2008-127495 | 6/2008 |
| JP | 2008-189895 | 8/2008 |
| WO | WO 2006-082908 | 8/2006 |

OTHER PUBLICATIONS

Written Opinion of the International Searching Authority mailed Mar. 30, 2010.
PCT Notification of Transmittal of Translation of the International Preliminary Report on Patentability (Chapter I) mailed Oct. 27, 2011.
International Search Report issued in International Application No. PCT/JP2010/053309.
Chinese Office Action (Application No. CN 201080016142.7) dated Nov. 30, 2012.
European Search Report dated Jun. 3, 2013 issued in European Application No. EP 10 74 8729.

* cited by examiner

Primary Examiner — Irina S Zemel
(74) Attorney, Agent, or Firm — Nixon Peabody LLP; Jeffrey L. Costellia (57) ABSTRACT

There is provided a novel polyamide particles having an approximately spherical outer shape, which are spongy particles having through-holes in an outer surface part and closed voids in an inside part. The polyamide particles can be produced by dissolving a polyamide in a cyclic amide with heating to obtain a homogeneous solution and then cooling the solution.

2 Claims, 9 Drawing Sheets

POLYAMIDE PARTICLES AND PROCESS FOR PRODUCING SAME

TECHNICAL FIELD

The present invention relates to polyamide particles and a process for producing the same.

BACKGROUND ART

Polyamide particles has been used in a wide variety of applications including cosmetics, additives to, for example, paints and waxes, lubricants, adhesives and antiadhesive agents. As examples of a manufacturing process therefor, there are known a process comprising blending Nylon 12 (polyamide 12) and dipropyleneglycol, heating the mixture for dissolution to give a homogeneous solution, and then cooling the solution to precipitate spherical particles of Nylon 12 (Patent Document No. 1); a process for manufacturing a porous polyamide particles comprising blending a solution of polyamide in phenol with methanol and water which are non-solvents to the polyamide (Patent Document No. 2); and a process comprising dissolving a polyamide in ethylene glycol by heating and cooling the solution to produce a spherical polyamide particles powder (Patent Document Nos. 3 and 4).

Among these documents, Patent Document No. 2 has described that porous particles were obtained as described above, and Patent Document No. 4 has described that "particles having porous surface" were obtained (paragraph 0048 and the like). However, in these documents, pores have a particular shape and form, depending on its manufacturing process, and therefore, may not be suitable for a variety of applications. For example, although polyamide particles obtained in Patent Document No. 4 is fine particles with a size of about 12 to 15 μm, it exhibits oil absorption ability of 140 mL/g or less, indicating insufficient porosity.

Furthermore, in a conventional manufacturing process, it is difficult to dry polyamide particles obtained by the manufacturing process by removing a solvent from them without causing the aggregation of particles, and a washing step requires a good deal of washing liquid. A conventional process is, therefore, not preferable in terms of a manufacturing cost and furthermore environmental impact.

Furthermore, there are no known processes for manufacturing polyamide particles using a cyclic amide as a solvent.

LIST OF REFERENCES

Patent Documents

Patent Document No. 1: Japanese Patent Laid-open publication No. 2006-169373.
Patent Document No. 2: Japanese Patent Laid-open publication No. 2008-38037.
Patent Document No. 3: Japanese Patent Laid-open publication No. 2006-328173.
Patent Document No. 4: Japanese Patent Laid-open publication No. 2007-56085.

SUMMARY OF INVENTION

Problems to be Solved by the Invention

An objective of the present invention is to provide novel porous polyamide particles. Another objective of the present invention is to provide a process for manufacturing polyamide particles, wherein a solvent used is easily removed and the polyamide particles is easily dried.

Means for Solving the Problems

We have found that in manufacturing polyamide particles, a novel porous polyamide particles can be produced by dissolving a polyamide in a cyclic amide with heating and then cooling the mixture and that the residual solvent, i.e. cyclic amide, in the particles can be minimized by washing the obtained novel porous polyamide particles with carbon dioxide in a liquid or supercritical state and then drying them.

Specifically, the present invention relates to the following items.

1. Polyamide particles having an approximately spherical outer shape, which are spongy particles having through-holes in an outer surface part and closed voids in an inside part.
2. The polyamide particles as described in item 1, having a number average particle diameter of 60 to 130 μm.
3. The polyamide particles as described in item 1, wherein a BET specific surface area is 15 $m^2/g$ or more.
4. The polyamide particles as described in item 1, wherein an accumulated specific surface area is 80 $m^2/g$ or more.
5. The polyamide particles as described in item 1, wherein a maximum pore diameter is 1 μm or less as measured by a mercury porosimeter.
6. The polyamide particles as described in item 1, wherein a median pore diameter is 0.5 μm or less as measured by a mercury porosimeter.
7. The polyamide particles as described in item 1, wherein a boiled linseed oil absorption is 170 mL/g or more as determined in accordance with JIS K 5101.
8. The polyamide particles as described in item 1, wherein a crystallinity degree is 45% or more as measured by differential scanning calorimetry (DSC).
9. A process for manufacturing polyamide particles as described in item 1, comprising dissolving a polyamide in a cyclic amide with heating to obtain a homogeneous solution and cooling the solution to precipitate polyamide particles.
10. The process for manufacturing polyamide particles as described in item 9, wherein concentration of the polyamide is 2% by weight to 30% by weight to the total weight of the polyamide and the cyclic amide.
11. The process for manufacturing polyamide particles as described in item 9, wherein the polyamide is selected from the group consisting of polyamide 6 (Nylon 6), polyamide 66 (Nylon 66) and polyamide 12 (Nylon 12).
12. The process for manufacturing polyamide particles as described in item 9, wherein the cyclic amide is selected from the group consisting of 2-pyrrolidone, N-methylpyrrolidone, ε-caprolactam, N-methylcaprolactam and α-lauryl lactam.
13. The process for manufacturing polyamide particles as described in item 9, further comprising, after obtaining the polyamide particles by dissolving the polyamide in the cyclic amide to obtain the homogeneous solution and then cooling the solution, washing the polyamide particles with carbon dioxide in a liquid or supercritical state and then drying the polyamide particles.

Effect of the Invention

According to the present invention, a novel polyamide particles can be manufactured by dissolving a polyamide in a cyclic amide with heating and cooling the mixture. Further, the residual solvent of cyclic amide in the polyamide particles can be minimized by washing the obtained novel polyamide particles with carbon dioxide in a liquid or supercritical state and then drying them. Since a cyclic amide soluble in liquid or supercritical carbon dioxide is used as a solvent, recovery and recycling of the solvent becomes simple and thus the process is industrially suitable.

Furthermore, a starting material for the polyamide can be used as the cyclic amide, which can eliminate the necessity for providing additional another solvent, resulting in efficient production by the effective use of materials.

Figure 3:
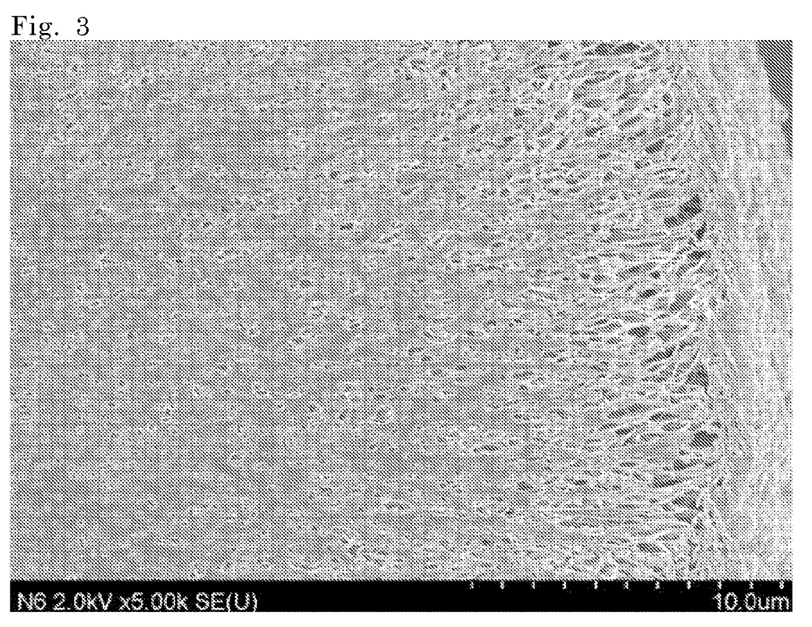
FIG. 3 is a 5000×SEM image of the section of a polyamide 6 particle produced in Example 1.
Figure 4:
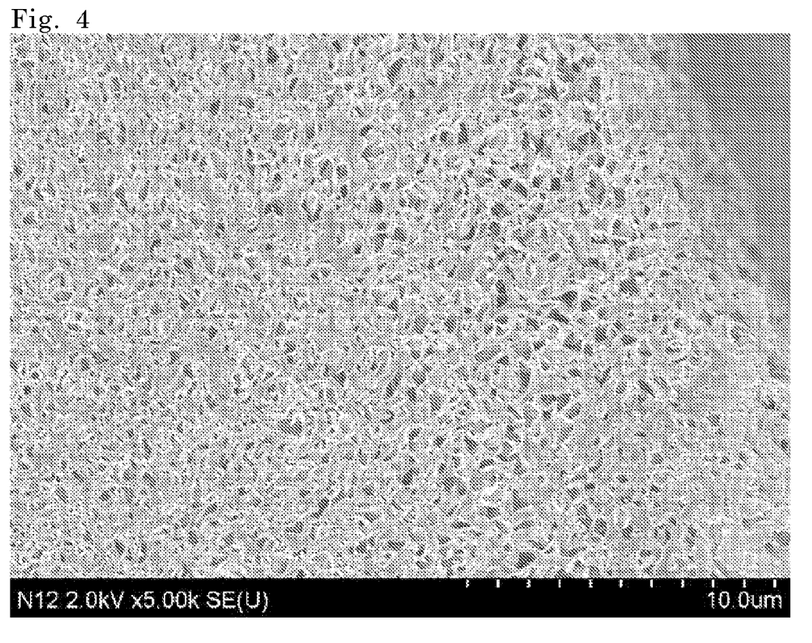
FIG. 4 is a 5000×SEM image of the section of a polyamide 12 particle produced in Example 6.

According to the analysis by SEM (Scanning Electron Microscopy), the prepared polyamide particles have spongy porous structure (see FIGS. 3 and 4). Furthermore, other analyses indicate that the particle has the unique properties described in the above items 1 to 8 and has superior properties to conventional products in scrubbing feeling and the like.

Furthermore, the polyamide particles of the invention is effective as a material for various cosmetics because of its excellent slipping property to skin, and are also excellent in high oil absorption because of its porosity.

MODE FOR CARRYING OUT THE INVENTION

The present invention provides polyamide particles having an approximately spherical outer shape, which are spongy particles having through-holes in an outer surface part and closed voids in an inside part.

Figure 1:
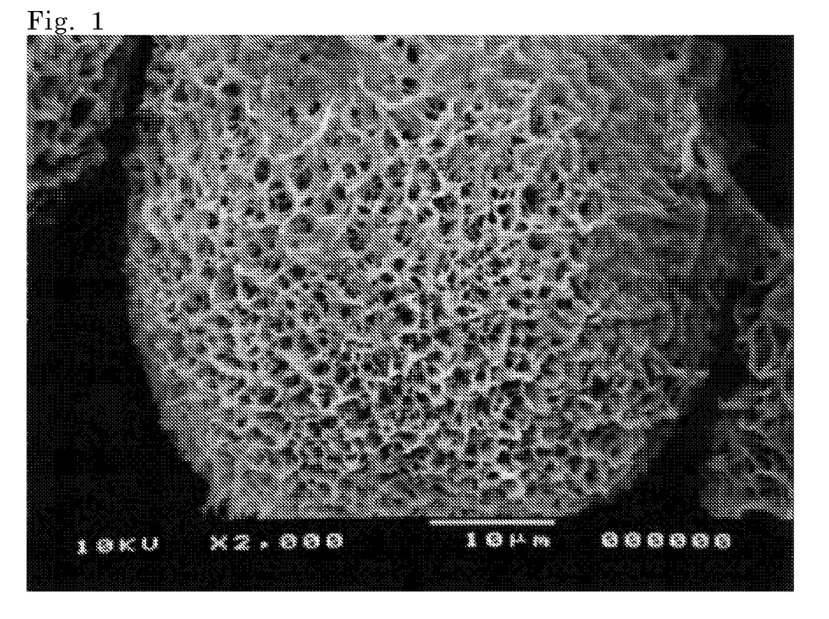
FIG. 1 is a micrograph of a polyamide 6 particle produced in Example 1.
Figure 2:
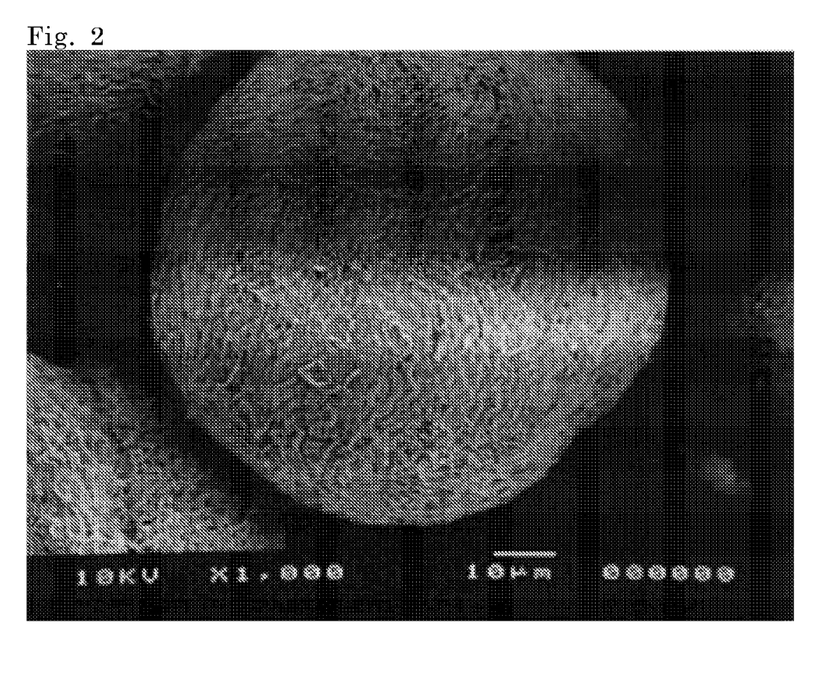
FIG. 2 is a micrograph of a polyamide 12 particle produced in Example 6.

Polyamide particles of the present invention has, as shown in scanning electron micrographs (SEM images) in FIGS. 1 and 2, a spongy structure in which through-holes are present in outer surface part and closed voids are present in the inside part. Since the through-holes are concentrated in the outer surface, a specific surface area is large although a particle diameter is large as described below.

The appearance of particles is approximately spherical fine particles, for example, sphere and spheroid. A number average particle diameter of the polyamide particles is within the range of 10 to 250 μm, particularly 20 to 200 μm, further 60 to 130 μm, and the particle diameter can be controlled by adjusting the concentration of polyamide and the cooling speed.

The other physical properties of polyamide particles of the present invention are as follows.

A BET specific surface area is generally 15 $m^2/g$ or more, preferably 15 to 50 $m^2/g$. Generally, a porous particle with a larger particle diameter tends to have a smaller specific surface area. However, the polyamide particles of the present invention has a large specific surface area although the particle diameter is around 100 μm. An excessively small specific surface area is undesirable because supporting capacity is lowered when it supports a catalyst or the like. An excessively large specific surface area tends to lower mechanical strength of the polyamide particles, so that the process for supporting a catalyst or the like tends difficult.

An accumulated specific surface area is generally 80 $m^2/g$ or more, preferably 80 to 200 $m^2/g$.

A maximum pore diameter as measured using a mercury porosimeter is generally 1 μm or less. This indicates that pores with a diameter larger than 1 μm or more do not exist on the particles. In addition, since it has a high BET specific surface area of 15 $m^2/g$ or more, it can be noted that the surface of the polyamide particles has a very large number of fine pores. This feature makes a release rate of an absorbed substance lower. This property is very useful in applications, such as cosmetics, paints, drugs and so forth, which require such properties that an adjuvant is absorbed by a particle as much as possible and released slowly rather than rapidly.

A median pore diameter as measured using a mercury porosimeter is generally 0.5 μm or less.

An absorption of boiled linseed oil is generally 170 mL/g or more.

A crystallinity degree as determined by DSC (Differential Scanning calorimetry) is generally 45% or more. While a crystallinity degree of a polyamide can be determined by X-ray analysis, DSC or a method using a density, preference in given to DSC among these. Generally, a crystallinity degree of a polyamide crystallized from a molten material is at most about 30%. A crystallinity degree of 40% or lower is undesirable because a porous particle shape is thermally unstable.

Polyamide particles of the present invention preferably have a crystallinity degree of 45% or more. Particularly preferably, its crystallinity degree is more than 50%.

Figure 7:
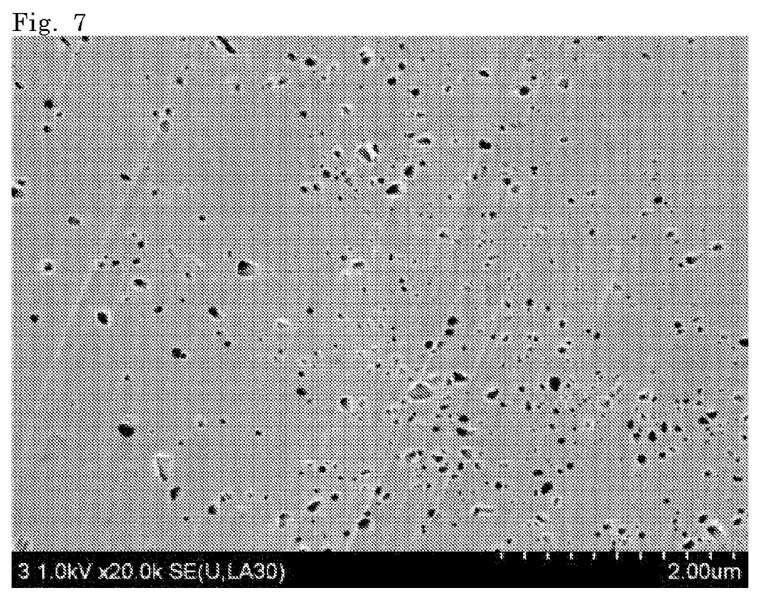
FIG. 7 is a 20000×SEM image of the section of a polyamide 6 particle produced in Example 1 after injection of an epoxy resin.
Figure 8:
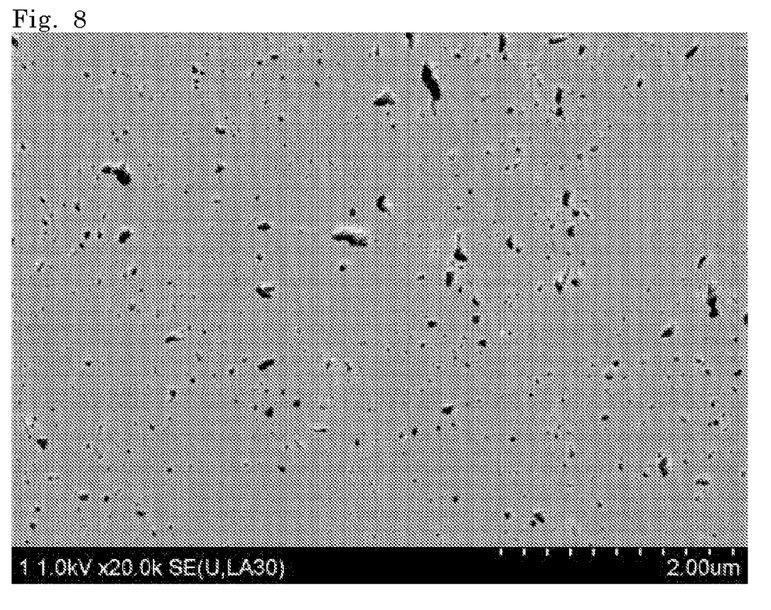
FIG. 8 is a 20000×SEM image of the section of a polyamide 12 particle produced in Example 6 after injection of an epoxy resin.

Polyamide particles of the present invention has a number of closed voids in its inside part as seen in scanning electron micrographs of FIGS. 7 and 8. The closed void in the present invention is a hole buried in the polyamide without being exposed from the surface of polyamide particles (encapsulated hole). On the other hand, a through-hole is a hole that is communicating with (i.e. spatially connected to) the surface without being completely enclosed in a polyamide. The hole can have a variety of forms; for example, its wall (section) can be straight or irregularly curved.

Whether a hole is a through-hole or closed void can be determined by scanning electron micrographic observation of a sample prepared by embedding and fixing polyamide particles in an epoxy resin which is then cured. An example of an epoxy resin which can be used is a formulation prepared by mixing a base resin (Epok812 from Okenshoji Co., Ltd., viscosity at 25° C.: 160 CPS, specific gravity at 25° C.: 1.24), a curing agent (methylnadic anhydride) and a polymerization promoter (DMP-30: 2,4,6-tris(dimethylaminomethyl)phenol) in accordance with a Luft method, which can be cured over 12 hours at 70° C. Without being limited to the epoxy resin, any resin having a similar viscosity and cured under the similar conditions can be used.

A ratio of closed voids to through-holes (sectional area ratio determined by the above observation of a section) in polyamide particles of the present invention varies depending on the manufacturing process, and is generally about 10:90 to 30:70.

This closed void can support a variety of functional substances such as an aromatic substance and an antimicrobial. Furthermore, by varying the type of a substance enclosed, elasticity of a particle itself can be altered.

Many of known polyamide particles having a particle diameter of about 100 μm have lower oil-absorption capacity due to their smooth surface, whereas polyamide particles of the present invention has a higher oil-absorption capacity owing to its bumps-and-dips surface. It is advantageous in that when it is used in a body cleaner, it gives good feeling such as comfort, scrubbing feeling and refresh feeling by appropriate stimulation to skin, and can be, therefore, expected to create a body cleaner giving new feeling.

In a process for manufacturing polyamide particles of the present invention, a polyamide is dissolved in a cyclic amide with heating to obtain a homogeneous solution and the solution is cooled to precipitate polyamide particles. The polyamide particles are advantageously washed with carbon dioxide in a liquid or supercritical state and dried. Resultantly, the amount of the residual solvent of cyclic amide can be reduced.

A polyamide used as a starting material in a process for manufacturing polyamide particles of the present invention is a polymeric compound having an amide (—CONH—) bond as a repeating unit prepared by, depending on polymerization modes, (1) ring-opening polymerization of a lactam, (2) polycondensation of an aminocarboxylic acid, (3) polycondensation of a diamine and a dibasic acid, and the like.

Specific examples of a polyamide include aliphatic polyamides such as polyamide 6 (Nylon 6), polyamide 66 (Nylon 66), polyamide 11, polyamide 12 (Nylon 12), polyamide 46, polyamide 610 and polyamide 612; aliphatic-aromatic polyamides such as poly(meta-xylene adipamide), poly(hexamethylene terephthalamide) and poly(hexamethylene isophthalamide) and copolymers thereof; and furthermore, polyamide 66, polyamide 612, poly(meta-xylene adipamide), poly(hexamethylene terephthalamide) or poly(hexamethylene isophthalamide) having a condensation moiety of 2-methylpentamethylenediamine with adipic acid or dodecanedioic acid; or copolymers thereof. These may be used in combination of two or more.

Additional examples include bio-based polyamides (not necessarily 100% bio-based) such as polyamide 1010 (PA1010), polyamide 610 (PA610), polyamide 11 (PA11) and polyamide 4 (PA4). Here, as PA1010, PA610 and PA11, commercially available products may be used and PA4 may be synthesized from 2-pyrrolidone as described in, for example, Japanese patent laid-open publication No. 2009-159840.

A cyclic amide used in the present invention preferably has 4 to 18 carbon atoms as ring members. Specific examples include 2-pyrrolidone, piperidone, N-methylpyrrolidone, ε-caprolactam, N-methylcaprolactam and ω-lauryl lactam. A cycloalkylidene ring may have a substituent which does not inhibit its reaction, and examples of such a substituent include acyclic or cyclic alkyl such as methyl, ethyl and cyclohexyl; acyclic or cyclic alkenyl such as vinyl and cyclohexenyl; aryl such as phenyl; alkoxy such as methoxy; alkoxycarbonyl such as methoxycarbonyl; and halogen such as chlorine. The cyclic amide is preferably unsubstituted 2-pyrrolidone or ε-caprolactam.

In a manufacturing process of the present invention, when a polyamide is dissolved in a cyclic amide with heating to prepare a homogeneous solution, the mixture is heated up to a temperature at which the cyclic amide is dissolved. The temperature is generally, but not limited to, 180 to 240° C., taking into the consideration that excessive heating may cause deterioration and/or coloration of a polyamide.

A time from initiation of adding the polyamide to the cyclic amide to formation of the homogeneous solution is generally 0.1 sec to 120 min, preferably 1 sec to 90 min, particularly preferably 1 sec to 60 min.

The amount of a polyamide is generally 2% by weight to 30% by weight, preferably 3% by weight to 20% by weight to the total weight of the polyamide and the cyclic amide. If the amount of the polyamide is lower, crystal grows in one direction, leading to a fibrous product while if the amount is higher, a product tends to be partly or entirely a block rather than a particle.

In precipitating polyamide particles, the solution may be cooled generally to 5 to 100° C., preferably to 10 to 80° C. A standing time of the homogeneous solution of the polyamide in the cyclic amide is generally 5 min or more, preferably 120 min or more from the time of formation of the homogeneous solution. A cooling rate is typically, but not limited to, 1.5 to 100° C./min.

In a manufacturing process of the present invention, polyamide particles precipitated from the homogeneous solution of the polyamide and the cyclic amide may be separated by a common method such as centrifugation, decantation and filtration. For example, to the mixture solution including the precipitated polyamide particles from a homogeneous solution of the polyamide and the cyclic amide, can be added a low-specific-gravity solvent such as methanol, isopropanol and water to increase difference in a specific gravity between the mixed solution and the polyamide particles. Then, the polyamide particles are separated by, for example, centrifugation or decantation. The precipitated polyamide particles may be washed several times with methanol, acetone or the like before separation by an appropriate method such as centrifugation and decantation. The polyamide particles separated from the mixture solution can be dried by a common means such as vacuum drying and a spray drier.

The polyamide particles obtained is spongy and porous as analyzed by SEM (Scanning Electron Microscope) (see FIGS. 3 and 4).

We have found that a cyclic amide used in the present invention has a property that it is dissolved in liquid carbon dioxide or supercritical carbon dioxide and have thus found that by washing polyamide particles obtained from the homogeneous solution of the polyamide and the cyclic amide with liquid carbon dioxide or supercritical carbon dioxide and then drying it, the polyamide particles can be separated and dried in one step, which produces polyamide particles containing little residual solvent of cyclic amide.

Washing and drying of polyamide particles utilizing carbon dioxide are carried out as follows.

In an autoclave equipped with a stirrer, a filter and a pressure regulator, the polyamide particles precipitated from the homogeneous solution of the polyamide and the cyclic amide were added with the solution without isolating the polyamide particles, and then the system is pressurized to 5 to 10 MPa by carbon dioxide. Then, the mixture is heated to a temperature of 20 to 100° C., and then carbon dioxide is fed by a pump. During the process, the solvent of cyclic amide and carbon dioxide are discharged from the pressure regulator. Then, after the pressure of the system is reduced to an ambient pressure, the system is opened and a dried polyamide particles are obtained.

Carbon dioxide has a critical temperature of 31° C. and a critical pressure of 7.38 MPa; for example, under 8 MPa, it is in a liquid state at 20° C. while being in a supercritical state at 50° C.

By washing and drying polyamide particles utilizing carbon dioxide as described above, a level of remaining solvent can be controlled to be 0.01% by weight or less, 100 ppm or less.

Polyamide particles provided by the manufacturing process of the present invention can be used as cosmetic materials such as cleansing masks, foundations, UV-care products, antiperspirants, face-washes, shower gels and detergent additives, and chromatography packings. It can be used as carriers or adsorbents for a variety of catalysts in the food engineering and the medical field, or such polyamide particles carrying a colorant can be used as toners for electrophotography or an electronic material for a display device and the like. Such a polyamide can be furthermore can be used in aqueous inks, HD abrasives, organic ELs, adhesives, electrostatic painting applications, powder coating applications and prototyping by laser sintering.

The present invention will be specifically described with reference to Examples, but the present invention is not limited to these examples. An oil absorption, pore size distribution, a specific surface area, a crystallinity degree and particle size distribution were determined as follows.

EXAMPLES

Measurement of an Oil Absorption

For determining an oil absorption of polyamide particles, an oil absorption of boiled linseed oil was measured in accordance with JIS K 5101.
<Determination of Pore Size Distribution>
Measurement was carried out using a automated mercury porosimeters PoreMaster-60 GT (from Quantachrome corporation). PoreMaster60GT (from Quanta chrome. Co.). The measurement conditions were as follows.
Sample amount: about 0.2 g
Sample cell: small cell (10 mmΦ×3 cm)
Measurement area: the whole area
Measurement range: pore diameter 400 μm to 0.0036 μm
Calculation range: pore diameter 400 μm to 0.0036 μm
Mercury contact angle: 140 deg
Mercury surface tension: 480 dyn/cm
Measurement cell volume: 0.5 cc
Number of measurement: once <Measurement of a Specific Surface Area>
Measurement was carried out using a high-speed specific surface area/pore size distribution measuring apparatus NOVA-1200 (Quanta chrome. Co.). The measurement conditions were as follows.
Pre-treatment conditions: a sample was placed in a cell, which was then evacuated at 100° C. under vacuum for 30 min.
Measuring principle: constant-volume technique (blank correction type)
Detection method: relative pressure; a ratio of an adsorption equilibrium pressure within a sample cell to a saturated vapor pressure by a pressure transducer
Adsorbed gas amount; from pressure detection by a pressure transducer and manifold temperature detection by a thermistor, an injected gas amount in an ideal gas was calculated.
Cell size: small pellet cell
Adsorbed gas: nitrogen gas
Measurement range: 0.01 $m^2$/g or more
Measurement point: three points in an adsorption side of P/P0=0.1, 0.2 and 0.3
Analyzed parameter: a specific surface area by a BET multipoint method
Number of measurement: twice for one sample
<Measurement of a Crystallinity Degree>
A crystallinity degree of polyamide particles was measured using a DSC (differential scanning calorimeter). A heat of crystal melting is calculated from an endothermic peak area in a temperature range of 120 to 230° C. at a temperature-rise rate of 5° C./min under nitrogen stream at a flow rate of 40 mL/min. A crystallinity degree is determined from a ratio of the calculated heat of melting to a heat of crystal melting of a polyamide constituting the polyamide particles. When the polyamide constituting the polyamide particles is polyamide 6, a heat of crystal melting is 189 J/g, and when it is polyamide 12, a heat of crystal melting is 209 J/g.
<Measurement of Particle Size Distribution>
Measurement was conducted using a laser diffraction/scattering type particle size distribution measuring apparatus LA-910 (from Horiba, Ltd.). The measurement conditions are as follows.
Measurement mode: Manual flow cell measurement
Measurement range: 0.02 μm to 1000 μm
Dispersion medium: 2-propanol, 200 cc
Refractive index: 1.28-0.001
Sample pre-treatment: A sample and a dispersion medium were placed in a sample tube and subjected to ultrasonic dispersion for 10 min.
Number of measurement; twice by replacing samples.

Example 1

Preparation of Polyamide 6 Particles Using 2-Pyrrolidone as a Solvent

In a mixing vessel equipped with a stirrer, a 20% by weight mixture of polyamide 6 pellet in 2-pyrrolidone was stirred at 200° C. under nitrogen atmosphere for about 60 min until polyamide 6 was completely dissolved. The resulting homogeneous solution was cooled to room temperature at a cooling rate of 1.5° C./min. To this mixture was added 2-propanol, and after removing the solvent by washing and filtration, the product was dried to give a spherical polyamide 6 particles. By microscopic observation of the resulting spherical particles, spherical particles with a particle diameter of 130 to 200 μm were observed (see FIG. 1). A particle diameter and its distribution of the particles obtained were determined using a particle size distribution measuring apparatus, and a median diameter of the spherical particles was 154.8 μm. A BET specific surface area of the spherical particles was 30.6 m$^2$/g.

Furthermore, from DSC measurement, a heat of crystal melting was 103 J/g. This value was used to calculate a crystallinity degree, and the crystallinity degree was 54%. A pore size distribution as determined using a mercury porosimeter was as follows; an accumulated specific surface area of 91 m$^2$/g, a mercury maximum pore diameter of 0.03 μm and a median pore diameter of 0.03 μm. Furthermore, an absorption of boiled linseed oil was 195 mL/g.

Figure 5:
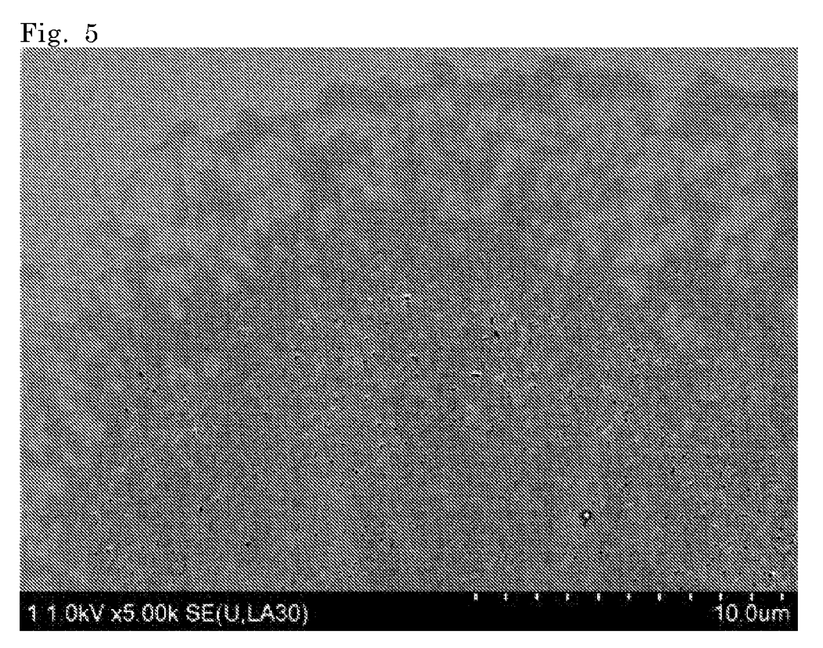
FIG. 5 is a 5000×SEM image of the section of a polyamide 6 particle produced in Example 1 after injection of an epoxy resin.

Table 1 shows the measurement results of a particle size distribution of the polyamide 6 particles prepared using 2-pyrrolidone. The polyamide particles was added to an epoxy resin {a formulation prepared by compounding a base resin (Epok812 from Okenshoji Co., Ltd., viscosity at 25° C.: 160 CPS, specific gravity at 25° C.: 1.24), a curing agent (methylnadic anhydride) and a polymerization promoter (DMP-30: 2,4,6-tris(dimethylaminomethyl)phenol) in accordance with a Luft method (Luft JH: Improvements in epoxy resin embedding methods, J Biophys Biochem Cytol, 9: 409-414, 1961)}, which was then cured at 70° C. for 12 hours, and the product was cut and observed by scanning electron micrography. The results are shown in FIGS. 5 and 7. As seen in the SEM images, through-holes are present in the outer surface part and closed voids are present in the inside part. A ratio of through-holes to closed voids was 8:2.

Example 2

Preparation of Polyamide 6 Particles Using 2-Pyrrolidone as a Solvent

Spherical polyamide 6 particles were prepared as described in Example 1, except that a cooling rate of a solution was 100° C./min and the solution was cooled to ice temperature. The observation and the measurement conducted as in Example 1 gave the following results.

Microscopy: spherical particles with a particle diameter of 20 to 40 μm;
Median diameter: 28.1 μm;
BET specific surface area: 10.9 m$^2$/g;
Measurement results of particle size distribution: shown in Table 1.

Example 3

Preparation of Polyamide 6 Particles Using 2-Pyrrolidone as a Solvent

Spherical polyamide 6 particles was prepared as described in Example 1, except that the amount of a polyamide 6 pellet used was 15% by weight. The observation and the measurement conducted as in Example 1 gave the following results.

Microscopy: spherical particles with a particle diameter of 80 to 130 μm;
Median diameter: 107.8 μm;
BET specific surface area: 11.9 m$^2$/g;
Measurement results of particle size distribution: shown in Table 1.

Example 4

Preparation of Polyamide 6 Particles Using ε-Caprolactam as a Solvent

Spherical polyamide 6 particles were prepared as described in Example 1, using ε-caprolactam in place of 2-pyrrolidone as a solvent. The observation and the measurement conducted as in Example 1 gave the following results.

Microscopy: spherical particles with a particle diameter of 80 to 130 μm;
Median diameter: 102.2 μm;
BET specific surface area: 23.3 m$^2$/g;
Measurement results of particle size distribution: shown in Table 1.

Example 5

Preparation of Polyamide 6 Particles Using ε-Caprolactam as a Solvent

Spherical polyamide 6 particles were prepared as described in Example 1, except that a solvent was ε-caprolactam in place of 2-pyrrolidone, a cooling rate of a solution was 100° C./min, and the solution was cooled to ice temperature. The observation and the measurement conducted as in Example 1 gave the following results.

Microscopy: spherical particles with a particle diameter of 40 to 90 μm;
Median diameter: 61.0 μm;
BET specific surface area: 19.9 m$^2$/g;
Measurement results of particle size distribution: shown in Table 1.

Example 6

Preparation of Polyamide 12 Particles Using 2-Pyrrolidone as a Solvent

Spherical polyamide 12 particles were prepared as described in Example 1, using polyamide 12 in place of polyamide 6. The observation and the measurement conducted as in Example 1 gave the following results.

Microscopy: spherical particles with a particle diameter of 110 to 180 μm (see FIG. 2);
Median diameter: 133.0 μm;
BET specific surface area: 8.7 m$^2$/g;
Heat of crystal melting: 108 μg;
Crystallinity degree: 52%;
Accumulated specific surface area: 92 m$^2$/g;
Mercury maximum pore diameter: 0.18 μm;
Median pore diameter: 0.12 μm;
Absorption of boiled linseed oil: 180 mL/g;
Measurement results of particle size distribution: shown in Table 1.

Figure 6:
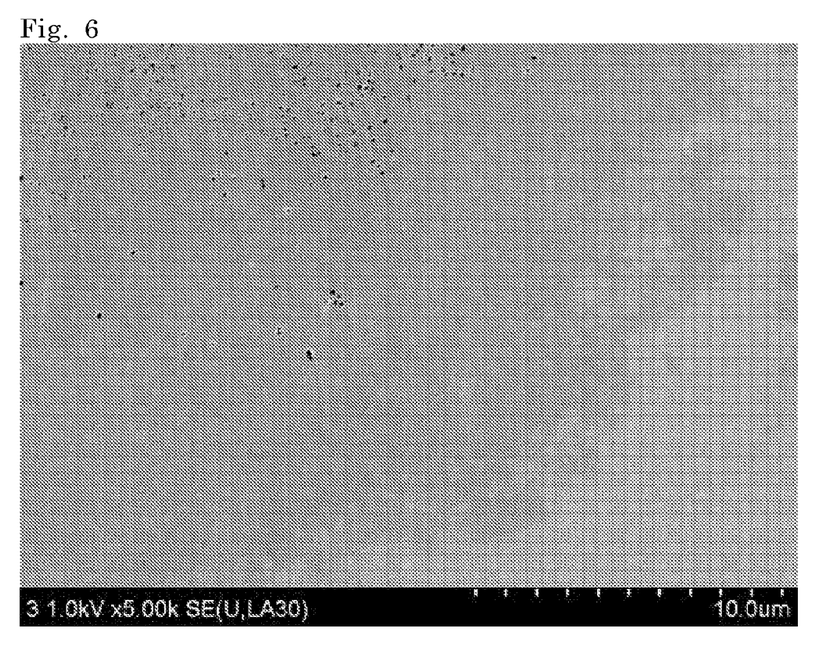
FIG. 6 is a 5000×SEM image of the section of a polyamide 12 particle produced in Example 6 after injection of an epoxy resin.

A sample prepared by adding an epoxy resin to polyamide particles and curing it as described in Example 1 was observed by scanning electron micrography. The images are shown in FIGS. 6 and 8. As seen in SEM images, through-holes are present in the outer surface part and closed voids are present in the inside part. A ratio of through-holes to closed voids was 8:2.

Example 7

Preparation of Polyamide 12 Particles Using 2-Pyrrolidone as a Solvent

Spherical polyamide 12 particles were prepared as described in Example 6, except that a cooling rate of a solution was 100° C./min and the solution was cooled to ice temperature. The observation and the measurement conducted as in Example 1 gave the following results.

Microscopy: spherical particles with a particle diameter of 60 to 120 μm;

Median diameter: 86.9 μm;

BET specific surface area: 16.7 m²/g;

Measurement results of particle size distribution: shown in Table 1.

Example 8

Preparation of Polyamide 12 Particles Using 2-Pyrrolidone as a Solvent

Spherical polyamide 12 particles were prepared as described in Example 6, except that the amount of polyamide 12 used was 15% by weight. The observation and the measurement conducted as in Example 1 gave the following results.

Microscopy: spherical particles with a particle diameter of 100 to 180 μm;

Median diameter: 119.6 μm;

BET specific surface area: 11.2 m²/g;

Measurement results of particle size distribution: shown in Table 1.

Example 9

Preparation of Polyamide 66 Particles Using 2-Pyrrolidone as a Solvent

In a mixing vessel equipped with a stirrer, a 5% by weight mixture of polyamide 66 pellet in 2-pyrrolidone was stirred at 230° C. under nitrogen atmosphere for about 60 min until polyamide 66 was completely dissolved. The resulting homogeneous solution was cooled to ice temperature at a cooling rate of 100° C./min. To this mixture was added 2-propanol, and after removing the solvent by washing and filtration, the product was dried to give a spherical polyamide 66 particles. The observation and the measurement conducted as in Example 1 gave the following results.

Microscopy: spherical particles with a particle diameter of 70 to 130 μm;

Median diameter: 96.5 μm;

BET specific surface area: 3.3 m²/g;

Measurement results of particle size distribution: shown in Table 1.

Example 10

Washing and Drying of Polyamide Particles Using Carbon Dioxide

In a 50 mL stainless steel autoclave equipped with a stirrer, a filter and a pressure regulator, 10 g of the mixture containing the polyamide particles obtained in Example 6 (a mixture of polyamide particles 12 and 2-pyrrolidone) was added, and the system was pressurized to 8 MPa by carbon dioxide. Then, the mixture was heated to 30° C., and then carbon dioxide was fed by a pump at 3 mL/min for 4 hours. During the process, 2-pyrrolidone used as a solvent and carbon dioxide were discharged from the pressure regulator. Then, after the pressure of the system was reduced to an ambient pressure, the system was opened and dried polyamide particles were obtained. The observation and the measurement conducted as in Example 1 gave the following results.

Microscopy: spherical particles with a particle diameter of 110 to 180 μm;

Median diameter: 133.3 μm:

BET specific surface area: 8.8 m²/g;

Measurement results of particle size distribution: shown in Table 1.

2-Pyrrolidone remained in the spherical particles was measured by gas chromatography, and it was 97 ppm.

Comparative Example

Preparation, Washing and Drying of Polyamide 12 Particles Using Ethylene Glycol as a Solvent In a mixing vessel equipped with a stirrer, a 10% by weight mixture of polyamide 12 pellet in ethylene glycol was stirred at 190° C. under nitrogen atmosphere for about 60 min until polyamide 12 was completely dissolved. The resulting homogeneous solution was cooled to room temperature at a cooling rate of 1.5° C./min, to give a mixture containing polyamide particles.

In a 50 mL stainless steel autoclave equipped with a stirrer, a filter and a pressure regulator, 10 g of the mixture containing the obtained polyamide particles was added, and the system was pressurized to 8 MPa by carbon dioxide. Then, the mixture was heated to 30° C., and then carbon dioxide was fed by a pump at 3 mL/min for 4 hours. Then, the pressure of the system was reduced to an ambient pressure, the system was opened. Ethylene glycol used as solvent remained in the autoclave, so that dried polyamide particles were not obtained.

TABLE 1

| Particle diameter (μm) | Particle size distribution frequency % | | | | | | | | | |
|---|---|---|---|---|---|---|---|---|---|---|
| | Example 1 | Example 2 | Example 3 | Example 4 | Example 5 | Example 6 | Example 7 | Example 8 | Example 9 | Example 10 |
| 517.2 | 0.1 | | | | | | | | | |
| 451.6 | 0.2 | | 0.2 | 0.1 | | 0.2 | | | | 0.2 |
| 394.2 | 0.4 | | 0.3 | 0.2 | | 0.3 | | 0.2 | | 0.3 |
| 344.2 | 1.1 | | 0.5 | 0.4 | | 0.5 | | 0.3 | | 0.5 |
| 300.5 | 2.8 | | 1.0 | 0.6 | | 1.2 | | 0.5 | 0.1 | 1.3 |
| 262.4 | 5.6 | | 1.8 | 1.3 | | 2.6 | 0.2 | 1.2 | 0.2 | 2.7 |
| 229.1 | 10.3 | | 3.1 | 2.7 | | 5.3 | 0.4 | 2.8 | 0.6 | 5.5 |
| 200.0 | 16.0 | | 5.2 | 4.8 | | 9.9 | 1.0 | 6.3 | 1.7 | 10.0 |
| 174.6 | 16.2 | | 7.4 | 7.2 | 0.1 | 13.5 | 2.5 | 10.6 | 3.8 | 13.4 |
| 152.5 | 15.7 | | 9.7 | 9.9 | 0.4 | 16.6 | 5.0 | 15.5 | 7.4 | 16.3 |
| 133.1 | 12.1 | | 11.5 | 11.9 | 1.1 | 16.5 | 8.8 | 17.9 | 12.0 | 16.1 |
| 116.2 | 9.2 | | 13.3 | 13.9 | 2.8 | 16.4 | 15.3 | 21.0 | 19.4 | 16.0 |
| 101.5 | 3.9 | | 11.3 | 11.8 | 5.4 | 8.4 | 14.9 | 11.3 | 16.1 | 8.4 |

TABLE 1-continued

| Particle diameter (μm) | Particle size distribution frequency % | | | | | | | | | |
|---|---|---|---|---|---|---|---|---|---|---|
| | Example 1 | Example 2 | Example 3 | Example 4 | Example 5 | Example 6 | Example 7 | Example 8 | Example 9 | Example 10 |
| 88.6 | 1.9 | | 10.3 | 10.6 | 11.2 | 5.2 | 17.4 | 7.7 | 16.6 | 5.3 |
| 77.3 | 0.7 | 0.3 | 7.8 | 8.0 | 16.7 | 2.3 | 13.1 | 3.2 | 10.5 | 2.4 |
| 67.5 | 0.3 | 0.8 | 5.4 | 5.4 | 16.4 | 0.9 | 7.0 | 1.1 | 4.7 | 0.9 |
| 58.95 | 0.1 | 2.1 | 3.7 | 3.6 | 15.7 | 0.3 | 4.0 | 0.4 | 2.3 | 0.4 |
| 51.47 | | 4.3 | 2.5 | 2.4 | 10.7 | 0.2 | 2.1 | 0.1 | 1.0 | 0.2 |
| 44.94 | | 7.8 | 1.7 | 1.6 | 7.2 | | 1.1 | | 0.5 | |
| 39.23 | | 11.8 | 1.1 | 1.1 | 4.3 | | 0.6 | | 0.2 | |
| 34.25 | | 14.8 | 0.8 | 0.7 | 2.3 | | 0.4 | | 0.1 | |
| 29.91 | | 17.6 | 0.5 | 0.5 | 1.2 | | 0.2 | | | |
| 26.11 | | 13.0 | 0.4 | 0.4 | 0.6 | | 0.2 | | | |
| 22.8 | | 10.5 | 0.3 | 0.3 | 0.3 | | 0.1 | | | |
| 19.9 | | 6.0 | 0.2 | 0.2 | 0.2 | | | | | |
| 17.38 | | 3.4 | | | | | | | | |
| 15.17 | | 1.8 | | | | | | | | |
| 13.25 | | 1.0 | | | | | | | | |
| 11.56 | | 0.6 | | | | | | | | |
| 10.1 | | 0.4 | | | | | | | | |
| 8.816 | | | | | | | | | | |

Example 11

Preparation of Polyamide 1010 Particles Using ε-Caprolactam as a Solvent

In a mixing vessel equipped with a stirrer, a 15% by weight mixture of polyamide 1010 pellet in ε-caprolactam was stirred at 200° C. under nitrogen atmosphere for about 60 min until polyamide 1010 was completely dissolved. The resulting homogeneous solution was cooled to room temperature at a cooling rate of 1.5° C./min. Then, the solution was processed as described in Example 1, to give spherical polyamide 1010 particles. The observation and the measurement conducted as in Example 1 gave the following results.

Figure 18:
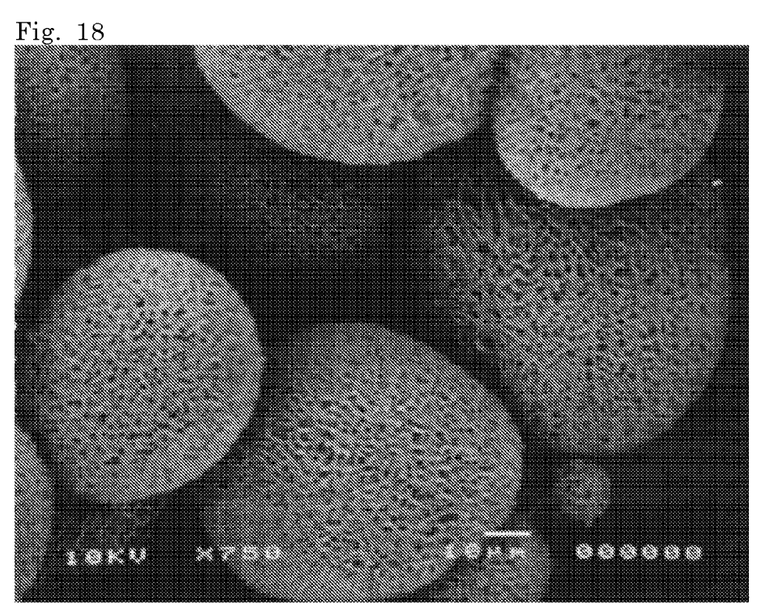
FIG. 18 is a microgram of polyamide 1010 produced in Example 11.

Microscopy: spherical particles with a particle diameter of 70 to 130 μm (see FIG. 18);
Median diameter: 110 μm;
BET specific surface area: 8.1 m²/g.

Example 12

Preparation of Polyamide 11 Particles Using ε-Caprolactam as a Solvent

In a mixing vessel equipped with a stirrer, a 15% by weight mixture of polyamide 11 pellet in ε-caprolactam was stirred at 200° C. under nitrogen atmosphere for about 60 min until polyamide 11 was completely dissolved. The resulting homogeneous solution was cooled to room temperature at a cooling rate of 1.5° C./min. Then, the solution was processed as described in Example 1, to give spherical polyamide 11 particles. The observation and the measurement conducted as in Example 1 gave the following results.

Microscopy: spherical particles with a particle diameter of 70 to 130 μm;
Median diameter: 105 μm;
BET specific surface area: 9.3 m²/g.

Example 13

Preparation of Polyamide 610 Particles Using ε-Caprolactam as a Solvent

In a mixing vessel equipped with a stirrer, a 15% by weight mixture of polyamide 610 pellet in ε-caprolactam was stirred at 200° C. under nitrogen atmosphere for about 60 min until polyamide 11 was completely dissolved. The resulting homogeneous solution was cooled to room temperature at a cooling rate of 1.5° C./min. Then, the solution was processed as described in Example 1, to give spherical polyamide 610 particles. The observation and the measurement conducted as in Example 1 gave the following results.

Microscopy: spherical particles with a particle diameter of 70 to 130 μm;
Median diameter: 108 μm;
BET specific surface area: 8.5 m²/g.

Examples of Use

There will be described examples of use of polyamide particles of the present invention.

Example U-1

Preparation of a Liquid Cleaner Containing Polyamide Particles

To ion-exchange water, added were potassium laurate, potassium myristate, glycelol, propylene glycol, hydroxypropylcellulose and coconut oil fatty acid diethanolamine in the amounts shown in Table 2, and the mixture was heated at 60° C. for dissolution. To the mixture, added were ethylene glycol distearate in the amount shown in Table 2 and the polyamide particles obtained in Example 1 in the amount shown in Table 2, and the mixture was homogeneously mixed. The mixture was cooled to 30° C., to prepare a liquid cleaner containing white opaque polyamide particles.

Example U-2

A liquid cleaner containing polyamide particles was prepared as described in Example U-1, using the polyamide particles obtained in Example 6.

Comparative Example U-1

A liquid cleaner containing polyamide particles was prepared as described in Example U-1, using general-purpose spherical polyamide 12 particles (SP-500, from Toray Industries, Inc.) as polyamide particles.

Figure 9:
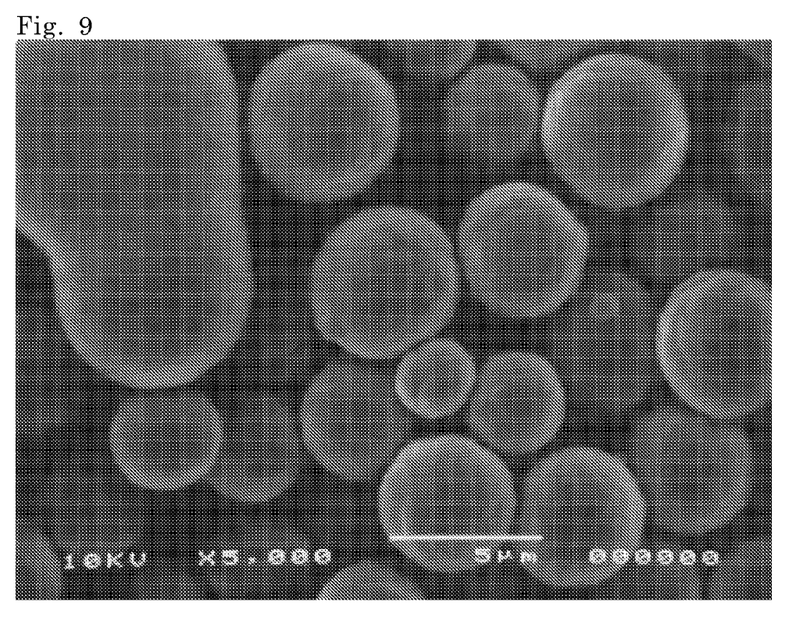
FIG. 9 is a micrograph of a spherical polyamide 12 particle produced in Comparative Example U-1.
Figure 10:
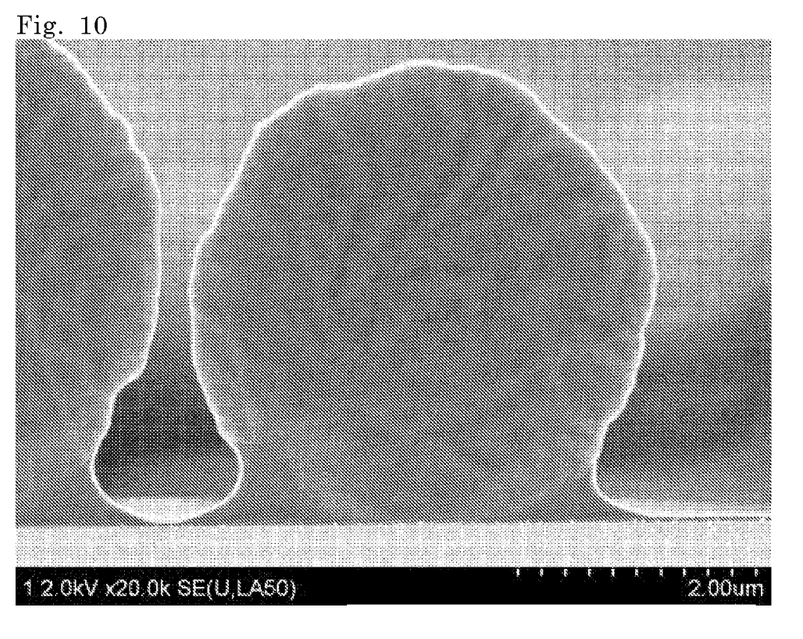
FIG. 10 is a 20000×SEM image of the section of a spherical polyamide 12 particle produced in Comparative Example U-1.
Figure 11:
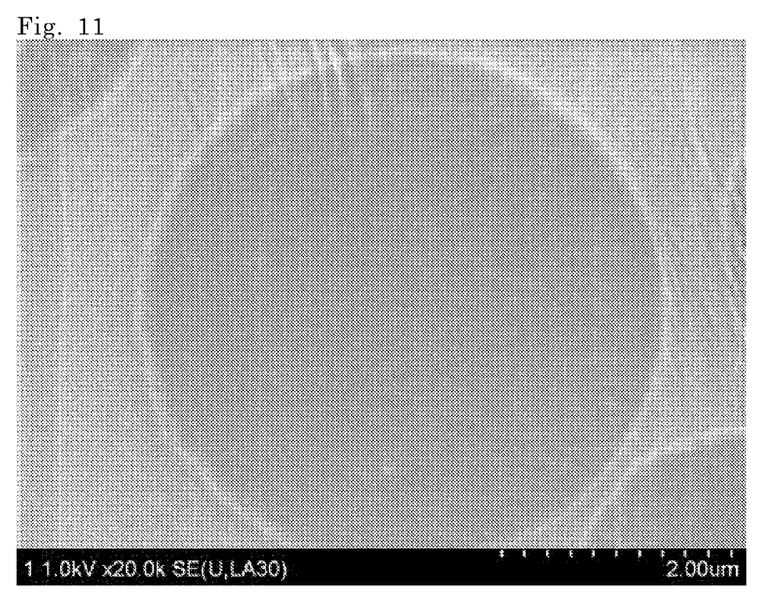
FIG. 11 is a 20000×SEM image of the section of a spherical polyamide 12 particle produced in Comparative Example U-1 after injection of an epoxy resin.

The surface and the section of the general-purpose spherical polyamide 12 particles (SP-500, from Toray Industries, Inc.) were observed by SEM images, and the surface was spherical and no pores associated with a porous particle were observed (FIG. 9). The outer surface had no through-holes and the inside had no closed voids (FIGS. 10 and 11). FIG. 11 is a scanning electron micrographic image of a sample prepared by adding an epoxy resin to the polyamide particles and then curing it as described in Example 1.

The general-purpose spherical polyamide 12 particles has the following properties.
Number average particle diameter: 10 μm;
Specific surface area: 1.2 $m^2/g$;
Accumulated specific surface area: 21.7 $m^2/g$;
Maximum pore diameter: 2.02 μm;
Median pore diameter: 1.83 μm;
Absorption of boiled linseed oil: 80 mL/100 g.

Comparative Example U-2

A liquid cleaner containing polyamide particles was prepared as described in Example U-1, using general-purpose porous non-spherical polyamide 12 particles (Orgasol 2002 UD NAT COS, from Atofina) as polyamide particles.

Figure 12:
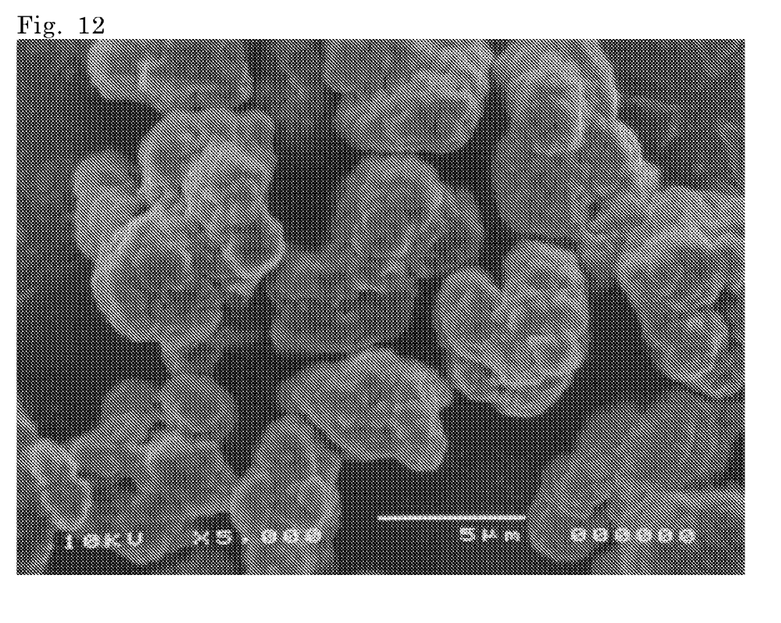
FIG. 12 is a micrograph of a porous polyamide 12 particle produced in Comparative Example U-2.
Figure 13:
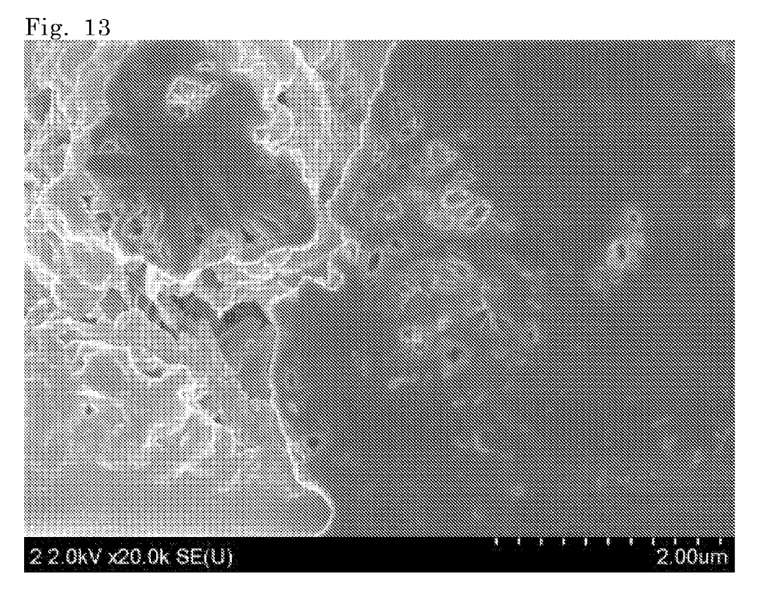
FIG. 13 is a 20000×SEM image of the section of a porous polyamide 12 particle produced in Comparative Example U-2.
Figure 14:
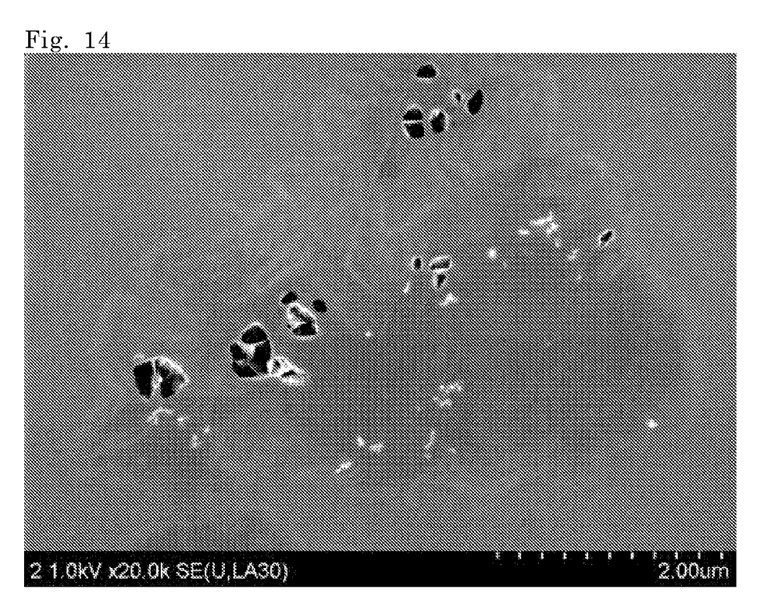
FIG. 14 is a 20000×SEM image of the section of a porous polyamide 12 particle produced in Comparative Example U-2 after injection of an epoxy resin.

The surface and the section of the general-purpose porous non-spherical polyamide 12 particles (Orgasol 2002 UD NAT COS, from Atofina) were observed by SEM images, and the surface was bumpy and pores associated with a porous particle were observed (see FIG. 12). The outer surface had little through-holes and the inside had no closed voids (FIGS. 13 and 14). FIG. 14 is a scanning electron micrographic image of a sample prepared by adding an epoxy resin to the polyamide particles and then curing it as described in Example 1.

The general-purpose porous non-spherical polyamide 12 particles has the following properties.
Number average particle diameter: 7 μm;
Specific surface area: 8.2 $m^2/g$;
Accumulated specific surface area: 30.1 $m^2/g$;
Maximum pore diameter: 1.88 μm;
Median pore diameter: 1.68 μM;
Absorption of boiled linseed oil: 80 mL/100 g.

Comparative Example U-3

A liquid cleaner containing polyamide particles was prepared as described in Example U-1, using general-purpose porous polyamide 6 particles (TR-1, from Metalcolor Co., Ltd.) as polyamide particles.

Figure 15:
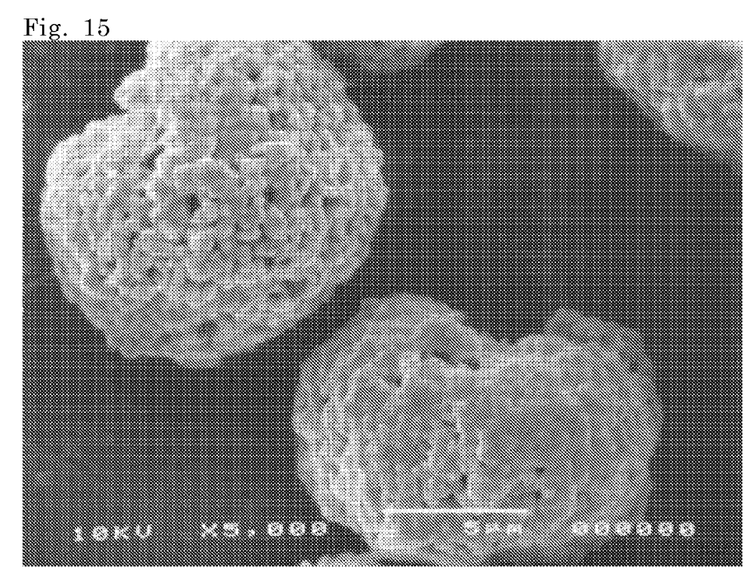
FIG. 15 is a microscope photograph of a porous polyamide 6 particle produced in Comparative Example U-3.
Figure 16:
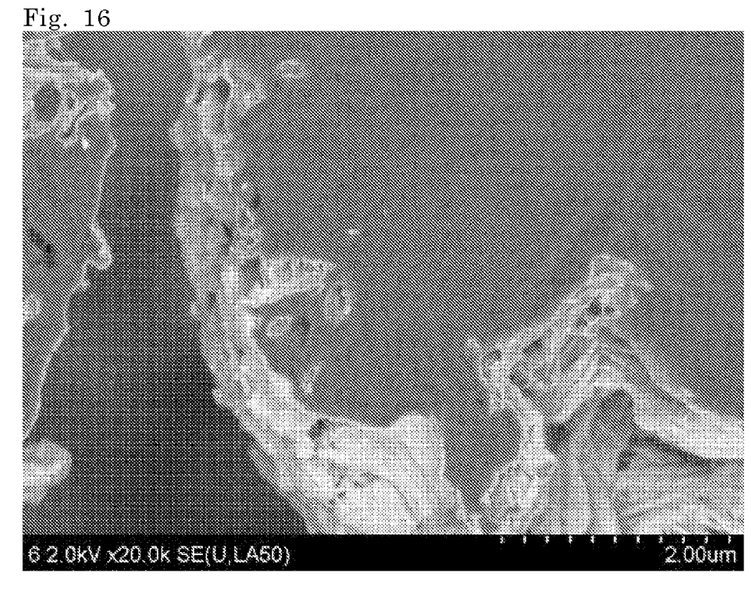
FIG. 16 is a 20000×SEM image of the section of a porous polyamide 6 particle produced in Comparative Example U-3.
Figure 17:
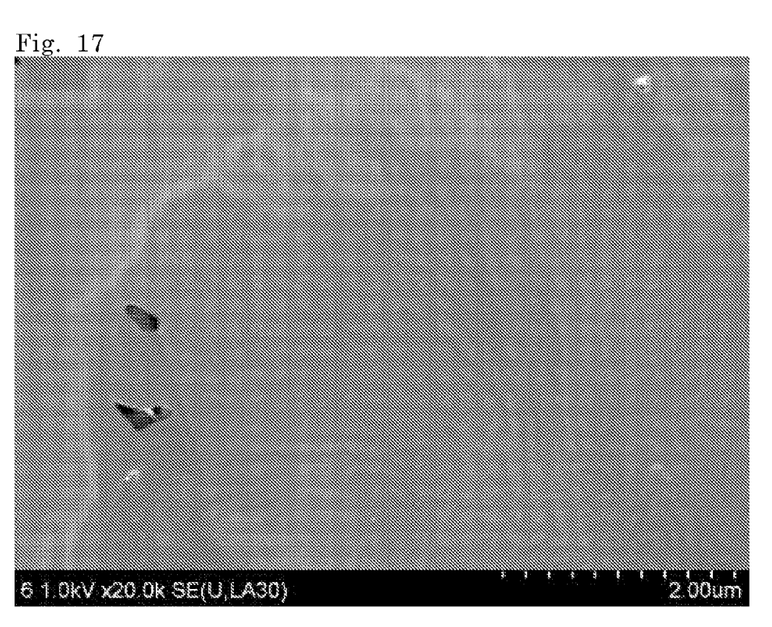
FIG. 17 is a 20000×SEM image of the section of a porous polyamide 6 particle produced in Comparative Example U-3 after injection of an epoxy resin.

The surface and the section of the general-purpose porous polyamide 6 particles (TR-1, from Metalcolor Co., Ltd.) were observed by SEM images, and the surface was bumpy and pores associated with a porous particle were observed (FIG. 15). The outer surface had little through-holes and the inside had no closed voids (FIGS. 16 and 17). FIG. 17 is a scanning electron micrographic image of a sample prepared by adding an epoxy resin to the polyamide particles and then curing it as described in Example 1.

The general-purpose porous polyamide 6 particles have the following properties.
Number average particle diameter: 15 μm;
Specific surface area: 2.5 $m^2/g$;
Accumulated specific surface area: 34.7 $m^2/g$;
Maximum pore diameter: 5.36 μm;
Median pore diameter: 5.05 am;
Absorption of boiled linseed oil: 130 mL/100 g.

Next, the liquid cleaner prepared in Examples U-1 to 2 and Comparative Examples U-1 to 3 were evaluated for 1) scrubbing feeling, 2) scrub removability during rinsing, 3) tingling after use, and 4) cleaning effect on the basis of the following criteria. The results are shown in Table 3.

Evaluation criteria for 1) scrubbing feeling, 2) scrub removability during rinsing and 3) tingling after use
Scrubbing Feeling
Satisfactory: 3 points;
Moderate: 2 points;
Less satisfactory: 1 point.
Scrub Removability
Very removable: 3 points;
Moderate: 2 points;
Less removable: 1 point.
Tingling
No: 3 points;
Somewhat: 2 points;
Yes: 1 point.
Averages for the individual evaluation items were calculated and evaluation was conducted on the basis of the following criteria. Ten panelists evaluated twice.
2.5 points or more and 3.0 points or less: ⊙⊙
2.0 points or more and less than 2.5 points: ⊙
1.5 points or more and less than 2.0 points: Δ
1.0 point or more and less than 1.5 points: x
4) Evaluation of Cleaning Effect Carbon black was applied to a palm in amount of 2 $mg/cm^2$, which was then dried. The liquid cleaner obtained in one of Examples U-1 to 2 and Comparative Examples U-1 to 3 was applied to the palm, which was then frictionally cleaned by a finger predetermined times. After washing with water and drying, a level of remaining carbon black per 1 $cm^2$ of the palm was observed by a stereomicroscope.

The cleaners were evaluated according to the following five levels.
5: High detergency (fouling in fine parts of the skin is substantially completely removed)
4: High detergency (about 80 to 90% of fouling in fine parts of the skin is removed)
3: Moderate detergency (about 60 to 70% of fouling in fine parts of the skin is removed)
2: Moderate detergency (about 40 to 50% of fouling in fine parts of the skin is removed)
1: Low detergency (about 20 to 30% of fouling in fine parts of the skin is removed)

TABLE 2

| Component | Example U-1 | Example U-2 | Comparative Example U-1 | Comparative Example U-2 | Comparative Example U-3 |
|---|---|---|---|---|---|
| | Example (% by weight) | | | | |
| Potassium laurate | 10.0 | | | 10.0 | |
| Potassium myristate | 10.0 | | | 10.0 | |
| Glycerol | 5.0 | | | 5.0 | |

TABLE 2-continued

| Component | | Example U-1 | Example U-2 | Comparative Example U-1 | Comparative Example U-2 | Comparative Example U-3 |
|---|---|---|---|---|---|---|
| | Propylene glycol | 10.0 | | | 10.0 | |
| | Ethylene glycol distearate | 5.0 | | | 5.0 | |
| | coconut oil fatty acid diethanolamine | 2.0 | | | 2.0 | |
| | Hydroxypropylcellulose | 0.5 | | | 0.5 | |
| | Ion-exchange water | 52.5 | | | 52.5 | |
| polyamide particles | Particles of Example 1 | 5.0 | 0 | 0 | 0 | 0 |
| | Particles of Example 6 | 0 | 5.0 | 0 | 0 | 0 |
| | Particles described in Comparative Example 1 | 0 | 0 | 5.0 | 0 | 0 |
| | Particles described in Comparative Example 2 | 0 | 0 | 0 | 5.0 | 0 |
| | Particles described in Comparative Example 3 | 0 | 0 | 0 | 0 | 5.0 |

TABLE 3

| | Example U-1 | Example U-2 | Comparative Example U-1 | Comparative Example U-2 | Comparative Example U-3 |
|---|---|---|---|---|---|
| (1) Scrubbing feeling | ○○ | ○○ | x | Δ | Δ |
| (2) Scrub removability | ○○ | ○○ | ○○ | ○ | ○○ |
| (3) Tingling | ○○ | ○○ | ○○ | ○○ | ○○ |
| (4) Detergency against carbon black | 5 | 5 | 4 | 4 | 4 |

Results

Examples U-1 and U-2 using the polyamide particles prepared in Examples 1 and 6 exhibited excellent scrubbing feeling and higher safety to the skin. They were highly detergent and very effective for removing fouling in fine parts of the skin.

In contrast, Comparative Examples U-1, U-2 and U-3 exhibited poor scrubbing feeling and slightly high detergency.

INDUSTRIAL APPLICABILITY

Utilizing at least one of the various properties described above, polyamide particles of the present invention can be used in a variety of applications such as cosmetics, paintings, drugs, catalysts and so forth.

The invention claimed is:

1. A process for manufacturing polyamide particles having an approximately spherical outer shape, which are spongy particles having through holes in an outer surface part and closed voids in an inside part, the process comprising: dissolving a polyamide in a cyclic amide with heating to obtain a homogeneous solution and cooling the solution to precipitate polyamide particles, wherein the polyamide is selected from the group consisting of polyamide 6, polyamide 66, polyamide 12, polyamide 1010, polyamide 610 and polyamide 11 and the cyclic amide is selected from the group consisting of 2-pyrrolidone, ε-caprolactam and ω-lauryl lactam, and wherein the concentration of the polyamide is 15% by weight to 30% by weight to the total weight of the polyamide and the cyclic amide, with the exception that in a case that the polyamide is polyamide 66 and the cyclic amide is 2-pyrrolidone, concentration of the polyamide is 5% by weight to 30% by weight to the total weight of the polyamide and the cyclic amide.

2. The process for manufacturing polyamide particles according to claim 1, further comprising, after obtaining the polyamide particles by dissolving the polyamide in the cyclic amide to obtain the homogeneous solution and then cooling the solution, washing the polyamide particles with carbon dioxide in a liquid or supercritical state and then drying the polyamide particles.

* * * * *